Patented Nov. 6, 1951

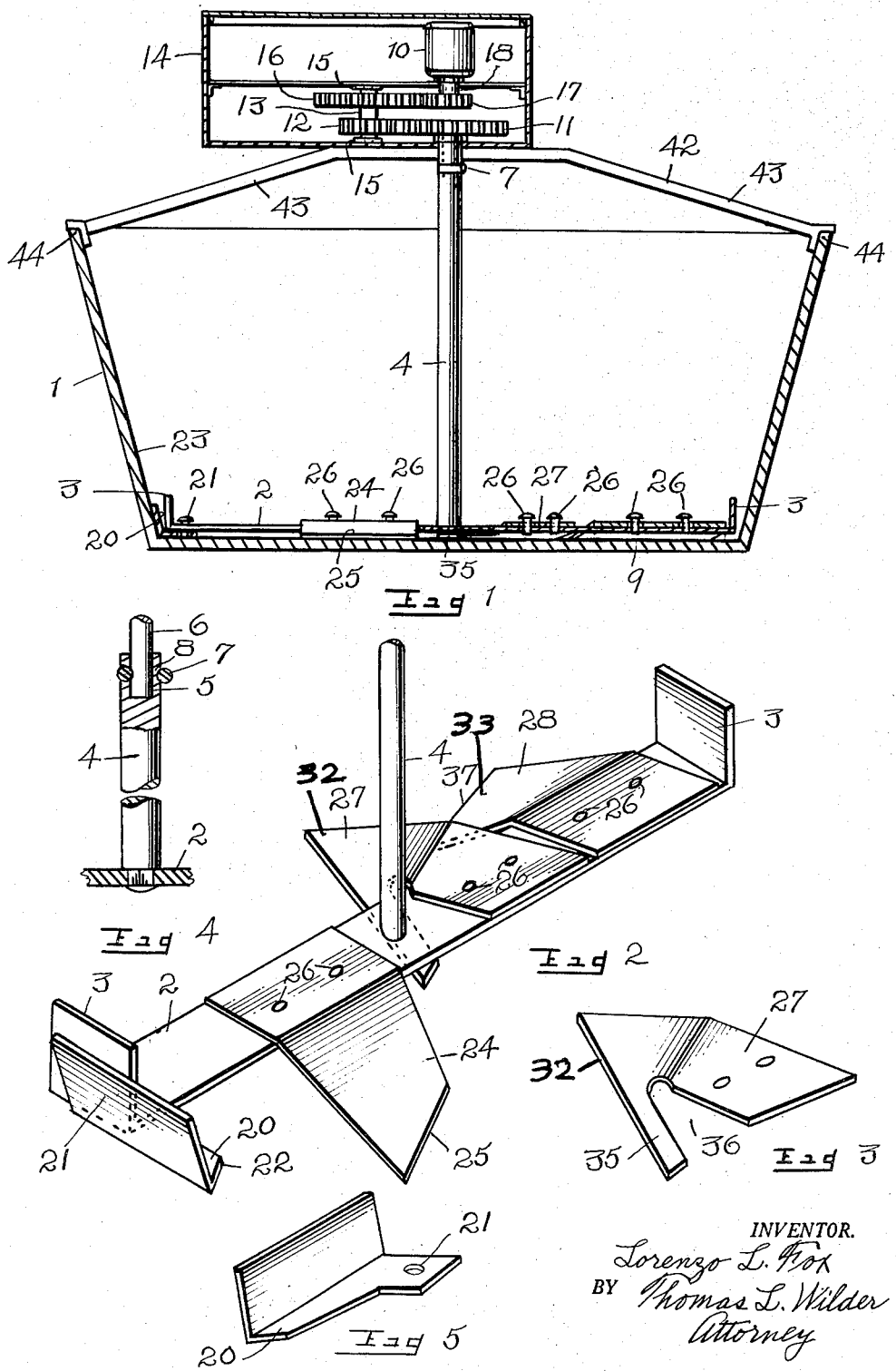

2,573,837

UNITED STATES PATENT OFFICE 2,573,837

AUTOMATIC STIRRING DEVICE FOR COOKING PANS

Lorenzo L. Fox, Little Falls, N. Y., assignor of one-half to J. T. McDermott, Albany, N. Y.

Application June 2, 1949, Serial No. 96,684

1 Claim. (Cl. 259—107)

My invention relates to an automatic stirring device for cooking pans, and I declare the following to be a full, clear, concise and exact description thereof sufficient to enable anyone skilled in the art to which it appertains to make and use the same, reference being had to the accompanying drawings in which like characters refer to like parts throughout.

The object of the invention is to provide a kitchen utensil that will prevent food, especially gravy, cereal or candy in the liquid stage from burning or sticking to the bottom of a pan while being cooked over direct heat or flame.

Heretofore, it was necessary for the chef to stir the food with a spoon from time to time to prevent burning or sticking of the food to the bottom of the pan. The present invention eliminates the necessity of watching and stirring the food by hand and substitutes a stirring device that acts automatically.

The object will be understood by referring to the drawings in which

Fig. 1 shows a vertical section of a pan with the device applied thereto.

Fig. 2 is a perspective view of the stirring device detached from the pan, parts broken away.

Fig. 3 is a detail view showing a perspective of one of the knives.

Fig. 4 is a detail view enlarged showing an upstanding shaft and connected members, parts being in section and parts broken away.

Fig. 5 is a detail view showing a perspective of another one of the knives used in the device.

Referring more particularly to the drawings the device can be applied to any pan such as 1. It consists of a cross bar 2 of narrow width having end flanges 3, 3. An upstanding center post or shaft 4 is welded or otherwise secured to cross bar 2 as by angling its lower end and projecting said end through a corresponding aperture in said cross bar 2. The lower end of shaft 4 will be flattened against the under surface of bar 2 to firmly secure said shaft 4 in upright position relative to bar 2.

An internally threaded recess 5 is bored in the top of shaft 4 for the reception of driven shaft 6 which is detachably held to shaft 4 in any suitable manner as by a snap ring 7 engaging an annular groove 8 in shaft 4, or it may be splined thereto. Said groove 8 is deep enough to form an opening at one part of shaft 4, whereby to allow snap ring 7 to engage an aligned groove in shaft 4.

Cross bar 2 will be held when in working position a little up and off the bottom inner surface 9 of pan 1. A train of reducing gears and pinions connects shaft 6 to electric motor 10. More particularly gear 11 turns with shaft 6. It meshes with pinion 12 mounted to turn with shaft 13 having loose bearings in box casing 14 at 15, 15. Gear 16 is mounted to turn also with shaft 13. It meshes with pinion gear 17 fixed to turn with motor power shaft 18.

The means for scraping the bottom of pan 1 comprises the several blades hereinafter mentioned, to wit, floating blade 20 comprises parts at right angles to each other. It is pivoted at 21 to cross bar 2, whereby the free end 22 of blade 20 will follow along and contact the circumferential inner edge of pan 1 to prevent the food from sticking at said edge. Head of pivot 21 is raised slightly off of the upper surface of blade 20 and works in a loose aperture therein, whereby said blade 20 can move or float up or down, in and out to anticipate any irregularities in the bottom surface 9 or of wall 23 of pan 1.

Next to blade 20 is a rectangular shaped blade 24 having an outer free edge 25 that tapers towards the center shaft 3 to effect a shearing action. Blade 24 is held by rivets 26, 26 likewise in a loose manner to allow movement vertically and laterally to a limited degree, whereby its edge 25 will be more or less free to anticipate any irregularities in the inner bottom surface 9 of pan 1 as in the case of blade 20.

Likewise blades 27 and 28 are attached loosely to the cross bar 2 by rivets 26, whereby their free edges 32, 33 respectively will contact the inner bottom 9 of pan 1 in a yielding manner. Blades 27 and 28 point in the opposite direction from blades 20 and 24, whereby to clean the entire bottom surface 9 of pan 1.

Blade 27 is triangular shaped. It has a projection 35 that is made by cutting a reentrant recess 36 therein. The projection 35 is bent downward, whereby it extends underneath cross bar 2 and beneath the location of the upstanding shaft 4, whereby to scrape the bottom of pan 1 at its center part or under shaft 4.

Blade 28 is rectangular in shape and has an edge 37 that tapers towards the center shaft 3. It is disposed at an angle to bar 2 and is located at the edge of bar 2 opposite the knife blade 20.

All of the above mentioned blades are so disposed, whereby to clean the entire bottom surface 9 of pan 1 and all are made to float as above stated to anticipate any irregularities in pan 1 and to avoid cutting into the surface 9 of pan 1.

The electric motor 10 and reducing gears above mentioned are housed in a casing 14 which is rigidly fastened by welding or otherwise to a spider 42 comprising four arms, 43, 43, 43, 43.

The free end of arms 43 are shouldered at 44 to detachably engage the upper peripheral edge 45 of pan 1.

*Operation*

The device is placed in a cooking pan 1, preferably one that is made to fit. The food such as candy, gravy or cereal is placed in pan 1 and shaft 4 and connected parts rotated at the desired velocity by electric motor 10 while the food is cooking. When the cooking is finished the device can be easily lifted off of pan 1.

The end flange 3 adjacent blade 20 will prevent said blade from swinging around backwards when not in working position.

Having thus described my invention, what I claim as new and desire to secure by Letters Patent is as follows:

In an automatic stirring device for cooking pans, a cross bar, an upright post fastened to said cross bar, blades mounted on the cross bar on one side of said upright post pointing in one direction, and certain other blades mounted on the cross bar on the opposite side of said upright post pointing in the opposite direction, means for holding said blades on said cross bar, apertures in said blades in which said means project, whereby to allow vertical and lateral motion of said blades, one of said blades having a projection for extending beneath said cross bar under said post, another of said blades having an upwardly extending portion and pivoted on said cross bar for scraping the intersection of the bottom and the upwardly extending wall of the pan.

LORENZO L. FOX.

REFERENCES CITED

The following references are of record in the file of this patent:

UNITED STATES PATENTS

| Number | Name | Date |
|---|---|---|
| 122,393 | Martien | Jan. 2, 1872 |
| 816,887 | Snigo | Apr. 3, 1906 |
| 1,366,777 | Flowers | Jan. 25, 1921 |
| 1,644,878 | Ellis | Oct. 11, 1927 |
| 1,958,301 | Greene | May 8, 1934 |
| 2,034,214 | Smith | Mar. 17, 1936 |

FOREIGN PATENTS

| Number | Country | Date |
|---|---|---|
| 63,950 | Sweden | June 15, 1925 |